May 22, 1951        O. E. ESVAL        2,553,560
AIRCRAFT TURN CONTROL
Filed July 10, 1946        3 Sheets-Sheet 3
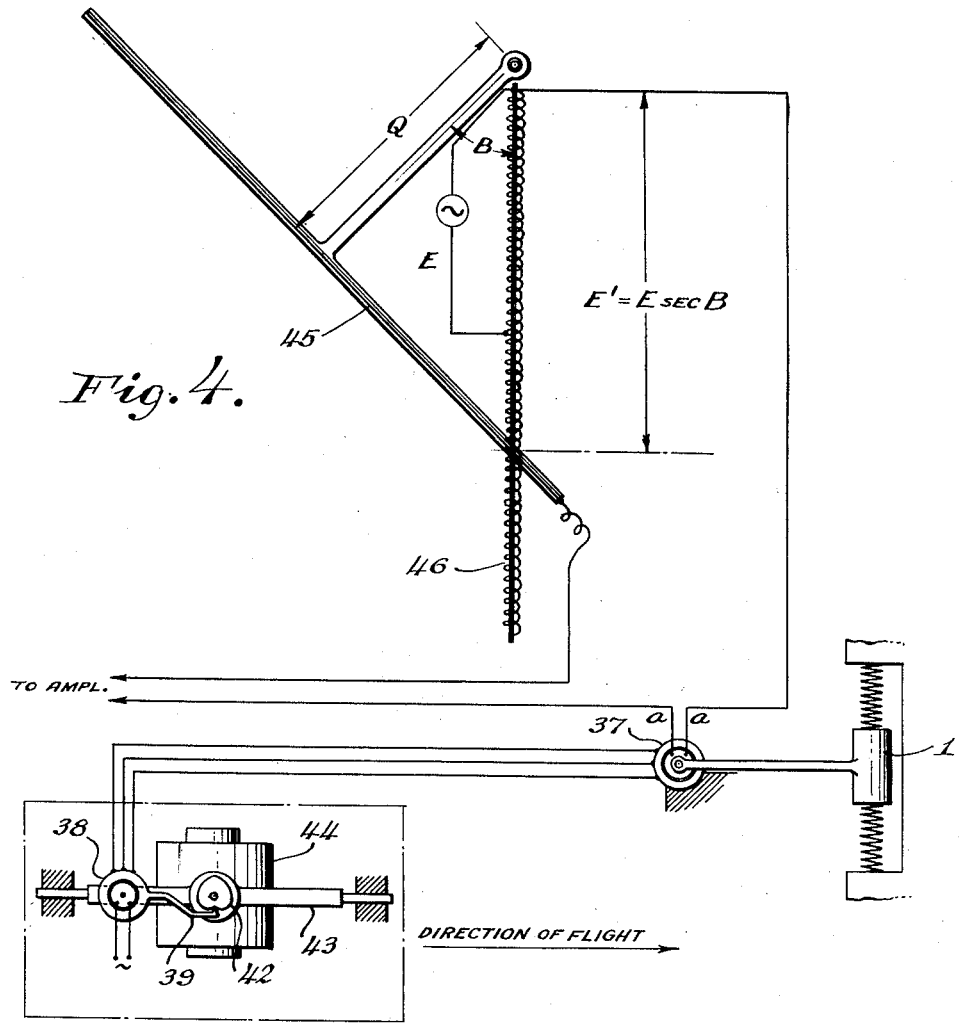
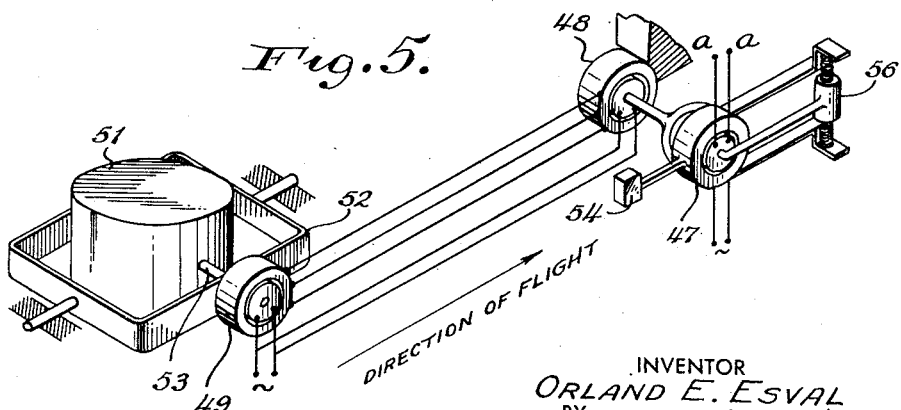
INVENTOR
ORLAND E. ESVAL
BY
Herbert N. Thompson
his ATTORNEY.

UNITED STATES PATENT OFFICE 2,553,560

AIRCRAFT TURN CONTROL

Orland E. Esval, Huntington, N. Y., assignor to The Sperry Corporation, a corporation of Delaware Application July 10, 1946, Serial No. 682,602

21 Claims. (Cl. 244—77)

This invention relates to improvements in flight control systems for dirigible craft, and in particular relates to means for preventing loss of altitude of a craft undergoing a banked turn.

In accordance with this invention, means are provided for producing a signal responsive to deviations of actual vertical craft-axis accelerations from ideal vertical craft-axis accelerations for any turn incurred bank angle. The signal produced is utilized to manipulate altitude controlling surfaces of the aircraft through appropriate servo mechanisms in a sense to reduce the deviation of actual acceleration from ideal acceleration and accordingly reduce the signal. Further, for a craft to maintain constant altitude during a banked turn, the ideal vertical craft-axis acceleration is a secant function of the angle of bank. Consequently, in keeping with these requirements for effecting a banked turn at a constant altitude, one principal feature of this invention appears in the arrangement, in a turn control system, of an accelerometer to measure the accelerations active on the craft's vertical axis and another feature is disclosed in the arrangements that afford a measure of ideal vertical craft-axis accelerations that are proportional to the aforementioned secant function of craft bank angle.

There are numerous well known types of accelerometers that could be advantageously utilized in the instant invention, and similarly, many arrangements may be provided affording a measurement of the secant of the bank angle of the craft. Thus a spring suspended weight may serve as an acceleration measuring means, and a measurement of the secant of the bank angle may be obtained by a calibrated secant cam, or by a stabilized support, angularly displaceable relative to a member movable only in a vertical craft plane, and arranged to produce displacement of that member in accordance with the secant of the bank angle.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the drawings,

Fig. 4 illustrates a method of obtaining a reference datum for the turn control that is corrected for craft pitch, and Fig. 5 illustrates an alternative method for the apparatus of Fig. 4.

Figure 1:
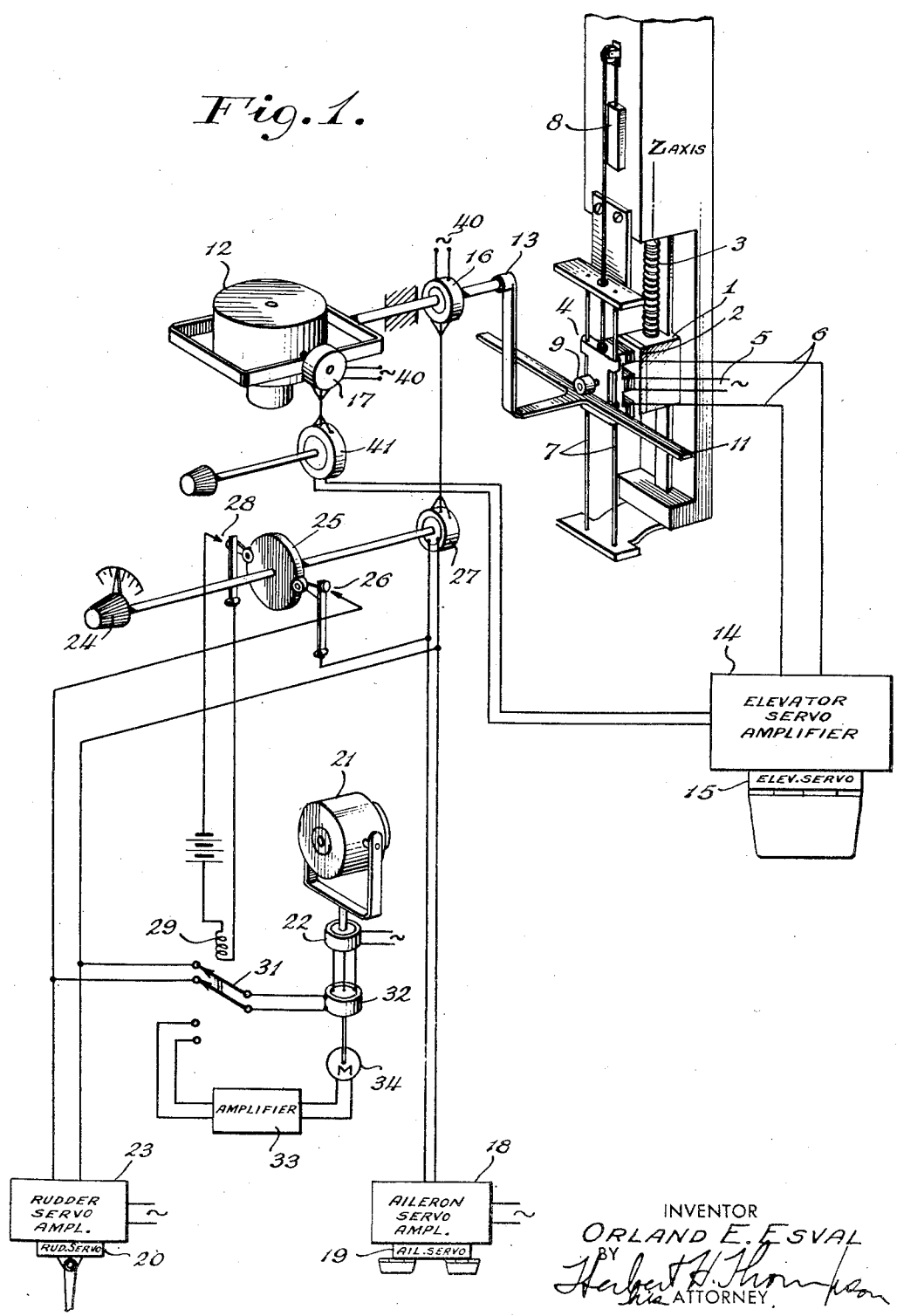
Fig. 1 is a schematic diagram of an embodiment of the instant invention in an aircraft flight control system.

Referring to Fig. 1, a weight 1 is constrained to movement along the craft Z-axis, or sometimes referred to as the vertical craft-axis. Attached to the weight 1 is a flat armature piece 2 which serves as a first part of a pick-off. The weight 1, and the armature piece 2, are suspended on a calibrated spring 3, which in turn is fastened to the aircraft. When the craft is in straight and level flight the weight 1, and armature piece 2 assume a position which reflects the action of gravity on their combined mass. But the accelerations active on the vertical craft-axis during a banked turn will cause a displacement of the weight 1 and armature piece 2 and in this displacement a measure of actual accelerations will be afforded. If a sudden updraft occurred, the position of the armature piece 2 would change and its new displacement would be in accordance to the acceleration caused by that updraft. To eliminate spurious accelerations the accelerometer could be damped by placing the moving elements in a liquid and thereby only steady accelerations, persisting beyond very short intervals would be measured. If the craft were entered into a banked turn, the armature piece 2 would assume a position responsive to that component of the resultant of the gravitational and centrifugal forces that is active on the vertical craft-axis.

Figure 2:
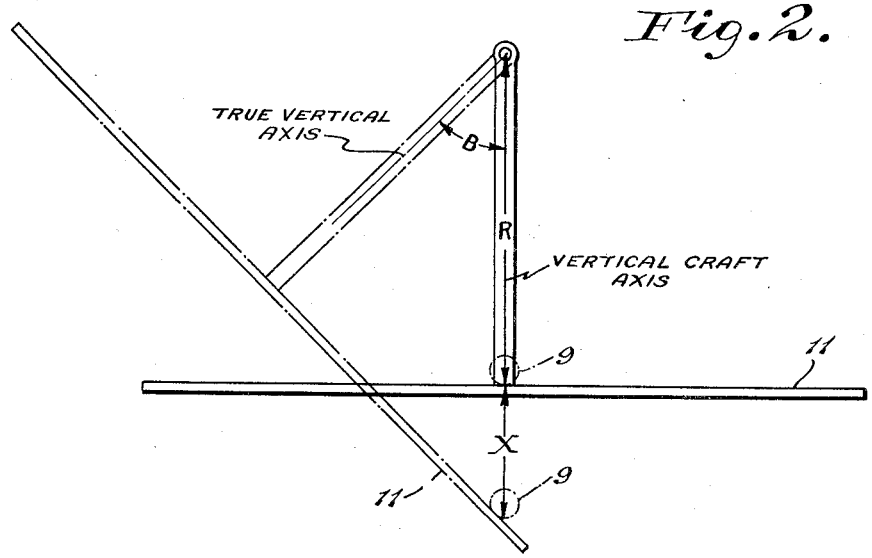
Fig. 2 is a diagram illustrating one method of obtaining a displacement in accordance with the secant of the bank angle.

The second part of the pick-off or signal means herein employed, as shown in Fig. 1, may be provided by an E-shaped pole piece 4. This conventional pick-off is of the type illustrated in U. S. Patent 1,921,983 issued to Wittkuhns on August 8, 1933. The pole piece 4 is guided by the wires 7, 7 to be movable along the vertical craft-axis in a plane paralleling the motion of the armature piece 2. A counterbalancing weight 8 is added to balance the weight of the pole piece 4 to eliminate any precessing movements that otherwise would disrupt the stability of vertical gyro 12. Pole piece 4 is equipped with a pick-off energizing coil terminating in the line 5 and pick-off output coils terminating in the lines 6, 6. When the pole piece 4 is displaced relative to the armature piece 2, an output signal is produced proportional to the extent of displacement. Pole piece 4 is provided with a roller 9 which in turn rests on the flat track-like surface 11. This track-like surface 11 serves to support the pole piece 4 through the roller 9. Surface 11 is, in this embodiment, stabilized in a horizontal plane by the vertical gyro 12 through the crank arm 13. Thus, as the vertical craft-axis tilts during a banked turn, the surface 11 is angularly displaced relative to the line of movement of the pole piece 4 permitting the displacement of the pole piece 4 in accordance with the secant of the angle of bank. That the displacement of pole piece 4 will be in accordance with the secant of the angle of bank, may be visualized with reference to Fig. 2, wherein B represents the angle of bank and R a constant, reflecting the construction of the arm 13. As the roller 9 supports the pole piece 4 in the vertical craft-axis, relative angular motion between the arm 13 and surface 11 will result in a displacement X of the pole piece 4. Expressing this relationship in an equation, $$\sec B = \frac{R+X}{R}$$

solving for X, $$X = R (\sec B - 1)$$

By selecting the spring 3, to be a length that will correspond to the distance R of the arm 13 for an acceleration of one gravitational unit, at straight and level flight, the equation becomes $$X = g \sec B$$

It is to be noted that this secant function yields an equation wherein the transition from straight and level to a banked condition is a smooth and uninterrupted transition. It is in this manner that the displacement of the pole piece along the vertical craft-axis may be made a function of the secant of the angle of bank, and the apparatus above described for producing this displacement may be considered a computing or resolving device.

During a banked turn, if the displacement of the armature piece 2 deviates from this ideal function of the banking angle, the output coils on pole piece 4 will produce an output signal proportional to that relative displacement. This output signal may be supplied to an elevator servo amplifier 14, and thence to a conventional elevator servo system 15 to produce an elevator surface control change to vary the lift of the craft in accordance with that output signal. From the description that follows, it will be seen that in this embodiment, the primary control surface is the elevator. Devices are illustrated that will enable the craft to enter a banked turn, but claim is not placed thereon. Thus, more adequate rudder control, incorporating pendulous reference, or other mechanisms well known to the art, might well be included with the subject matter of the instant invention. However, for reasons of maintaining simplicity, only the most elementary, well known devices are shown. For a more detailed solution of the rudder problem reference is made to U. S. Patent No. 2,003,930 issued to Fischel.

The vertical gyro 12 is provided with an elevation pick-off 17, having an A. C. input 40. The output from pick-off 17 is connected to the Selsyn 41 which serves as an elevator trim device and from there the signal is supplied to the elevator servo amplifier 14. Prior to entering into a banked turn, this trim device must be manipulated to place the elevator surface in straight and level flight. Thereafter the signals from the gyro pick-off 17 and the accelerometer pick-off on wires 6, will serve to control the elevator in the manner described.

The vertical gyro 12 is also provided with a bank pick-off, having an input signal 40 and connected to Selsyn 27 in a manner well-known to the art, to produce an output signal for the aileron servo amplifier 18 in accordance with disagreement in angular position between the rotor of pick-off 16 and the rotor of Selsyn 27. Thus, in straight and level flight, any force that might cause the craft to bank will serve to produce a displacement of the rotor (not shown) of the pick-off 16, thusly producing a disagreement between its angular position and the relative angular position of the rotor of Selsyn 27 (also not shown) resulting in an output signal from Selsyn 27 to the aileron servo amplifier 18, and finally in action by the aileron servo 19 serving to apply aileron to counteract the effect of the force that caused the craft to bank. However, if it is desired to bank the craft to execute a turn, knob 24 is moved to the right or left, an amount corresponding to the bank angle productive of the rate of turn desired. As knob 24 is turned, the rotor of Selsyn 27 will be angularly displaced relative to the rotor of pick-off 16, and an output signal will be transmitted to the ailerons as hereinbefore explained, and the craft will enter a banked turn. To provide some rudder signal to assist the craft into the banked turn, a cam 25 is mounted to turn with the knob 24. As the knob 24 turns to any position but vertical, the cam closes switch 26, causing some aileron signal to be supplied to the rudder servo amplifier 23. At the same time, as knob 24 is turned, switch 28 is closed, causing coil 29 to be energized, moving switch 31 downward, thereby diverting the output signal from pick-off 22 on gyro 21 to be supplied through the amplifier 33 causing the signal to operate motor 34 to drive the rotor of Selsyn 32 to a null position during a banked turn, so that upon engagement, the rotors of Selsyn 32 and pick-off 22 will not be in disagreement. In other respects, the directional gyro is of conventional design and of the type usually found in automatic pilots. If due to peculiar turn characteristics of any particular aircraft, it becomes desirable to incorporate a side-slip detecting apparatus, a device as set forth in U. S. Patent No. 2,371,388 to Glenny, may well be incorporated with the instant invention.

It can readily be seen from the aforesaid that the apparatus herein is particularly adaptable to aircraft having but two control surfaces. In any event, with devices similar to the rudder connections substantially as illustrated herein, this invention lends to adaptability for use in other craft such as the three control craft set forth in Fig. 1.

As the craft assumes a banked condition, the weight 1, being constrained to motion along the vertical axis of the craft, will assume a new position reflecting the acceleration active on the vertical craft-axis. At the same time the flat surface 11, being stabilized by the vertical gyro 12 will maintain a true horizontal position and, in effect, will be angularly displaced relative to the line of travel of pole piece 4, causing the supporting roller 9 to move along the surface 11, resulting in a displacement of the pole piece 4 in accordance with the secant of the bank angle. Thus, if the actual vertical craft acceleration is productive of a displacement of armature piece 2 equal to the displacement of pole piece 4, the pick-off output in lines 6 will be zero. However, any disagreement in relative positions of armature piece 2 and pole piece 4 will effect a signal in lines 6, and as a consequence, the elevator servo amplifier 14 will cause the craft's elevators to move in a sense that will counteract the sense of the relative displacement. This correcting signal will persist until such time as the disagreement of relative displacement discontinues, and the signal output through lines 6 returns to zero. It is in this manner that the craft is flown, through the control apparatus set forth herein, to a vertical craft-axis acceleration that is in proportion to the secant of the angle of bank.

Figure 3:
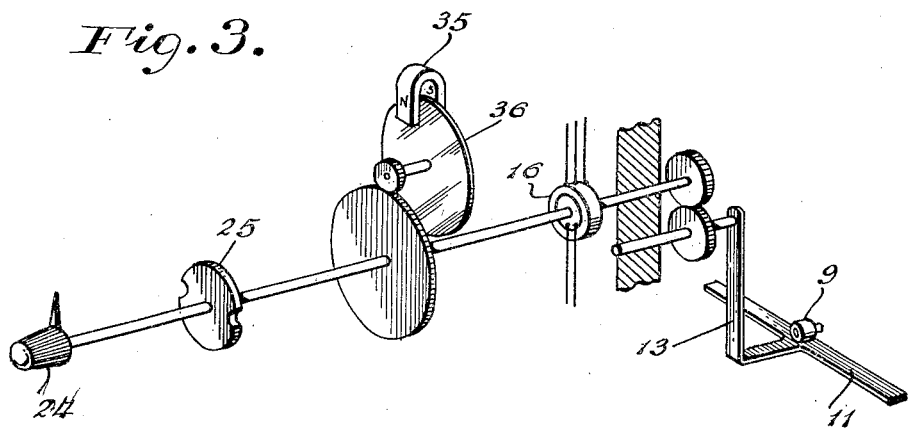
Fig. 3 is a schematic diagram of a simplified pick-off reference datum for the turn control.

A simplified embodiment of the instant invention, illustrated in Fig. 3, provides a method for maintaining the datum of the pole piece 4, in a true horizontal position by the expedient of manually shifting the horizontal reference track 11 to an angular relationship with the craft that is equal and opposite to the bank angle of the craft. By substituting the apparatus illustrated in Fig. 3 for the corresponding items in Fig. 1, that bear the same reference numerals, the turning of the knob 24 to an angular position corresponding to the bank angle that the craft is actually flying in (having been entered into a banked turn by means not shown in Fig. 3) causes the surface 11 to assume the angular position equal and opposite to the angle of bank, and hence in effect, to maintain a true horizontal reference for the pick-off datum, or pole piece 4. A braking device is included to prevent the rapid turning of the knob 24 to a setting the craft could not follow. This brake may consist of a permanent magnet 35 and a copper disc 36, in the relationship shown. The remainder of the apparatus may be similar to the apparatus of Fig. 1.

An alternative method of providing a reference having an output proportional to the secant of the bank angle and wherein the effect on the accelerometer displacement of the craft attitude about its pitch axis is compensated, is illustrated in Fig. 4. The accelerometer includes weight 1, suspended from a spring to produce a displacement in linear Selsyn 37 in accordance with accelerations active in the vertical craft-axis. However, the output of the Selsyn 37 is modified by the output from Selsyn 38. The rotor of Selsyn 38 is rotated by the lever arm 39 which, in turn, rides the cam 42. The cam 42 is in the form of an Archimedean spiral, one in which the radius increases linearly with the angle. The cam 42 is mounted on the gimbal 43 of the vertical gyro 44. Thus, as the pitch of the craft varies, gyro 44 will remain vertical and the cam 42 will move relative to the gimbal 43, causing the lever arm 39 to rotate the rotor of Selsyn 38. By arranging Selsyn 37 to have a rotor movement of, for instance, 5 or 10 degrees per gravitational unit, the output from Selsyn 37 will be linear over its operating range. Through adjustment of Selsyn 38 to have the same rotor movement, either 5 or 10 degrees, during a 90 degree change in pitch, then Selsyn 38 will be rotated as a linear function of pitch angle but at a reduced rate. The length of lever 39 must be selected to produce substantially linear motion at the point that it makes contact with the cam 42. The double cam 42 provides means for shifting the bias on the accelerometer pick-off in the same direction, regardless of whether the pitch is changed upwardly or downwardly. The arm 13 of Fig. 1 has been replaced by the wiper 45, which is stabilized by a gyro in a manner similar to that shown in Fig. 1. With an input voltage E to the auto-transformer 46, as the coil is rigidly attached to the vertical craft-axis, the angular displacement of the wiper 45 will produce an output voltage equal to E sec B where B is the angle of bank. By connecting the output in series opposition with the output of the Selsyn 37, the net output to the amplifier will be in proportion to any deviation of accelerometer 1 from this secant function of the bank angle and will be corrected for varying attitudes of the craft.

An alternative method of providing for pitch change compensation is illustrated in Fig. 5, wherein an accelerometer 56 is operatively connected to rotate the rotor of the Selsyn 47. Further, the frame or support of the accelerometer is mounted to be rotatable in cooperation with the stator of Selsyn 47, thereby affording an acceleration measurement in the meridian or true vertical plane of the craft. A weight 54 is used for counterbalancing purposes. The stator of the Selsyn 47 is connected to the rotor of Selsyn 48 which by virtue of its connection to Selsyn 49, will assume the same position as the rotor of Selsyn 49. The vertical gyro 51 is mounted on gimbal 52. Selsyn 49 is mounted on gimbal 52 and the rotor of Selsyn 49 will assume the pitch angle as indicated by the gyro 51, there being a direct connection between the Selsyn rotor and the shaft 53. In this fashion as the pitch angle of the craft is altered, the stator of Selsyn 47 together with the frame supporting the accelerometer 56 will be angularly displaced in accordance with the change, and the output then applied to point a—a of Fig. 4 to be further modified by a signal that is proportional to the secant of the angle of bank.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a turn control for an aircraft, an accelerometer device responsive to vertical craft axis accelerations and having an output in accordance therewith, a computing device responsive to craft bank angle and having an output in accordance with a secant function thereof, and signal output means responsive to the difference in output from said devices.

2. A control system for a dirigible craft comprising means for causing the craft to enter a banked turn, a pick-off having a first and second part, a first element displaceable in response to vertical craft axis accelerations and operatively connected to said first part, a second element displaceable in accordance with a secant function of craft bank angle and operatively connected to said second part, said pick-off producing a signal proportional to the relative displacement between said first and second part, and means responsive to said signal for maintaining the craft at constant altitude during a banked turn.

3. A control system for a dirigible craft comprising means for causing the craft to enter a banked turn, pick-off means including two relatively movable parts for producing a signal for maintaining the craft at constant altitude during the turn, an accelerometer having a displaceable member responsive to vertical craft axis accelerations and operatively connected to one of said parts, and an element displaceable in accordance with a secant function of craft bank angle and operatively connected to the other of said parts.

4. In a flight control system for dirigible craft, means including two relatively movable parts for producing a signal in proportion to the relative movements of said parts, an accelerometer having a displaceable member responsive to accelerations normal to the horizontal craft axis and operatively connected to one of said parts, and an element displaceable as a function of craft bank angle and operatively connected to the other of said parts.

5. In a turn control for a dirigible craft, signal means including first and second relatively displaceable members, said first member being displaceable in accordance with accelerations in the craft vertical plane, said second member being displaceable in accordance with a function of craft bank angle during a turn, said means producing a signal in accordance with the relative displacement of said members.

6. An altitude control for dirigible craft in a banked turn comprising, signal means including first and second relatively displaceable members, an accelerometer having said first member operatively joined thereto and displaceable in accordance with vertical axis craft accelerations, said second member having means providing a displacement variable with the secant of the angle of bank, said signal means having an output in accordance with the relative displacements of said first and second members, and altitude controlling means responsive to said ouput.

7. A control system for a dirigible craft comprising, means for causing the craft to enter a banked turn, a signal producing means including a first and second part, the signal produced by said means being a function of relative displacement between said parts, a first member displaceable in accordance with vertical craft axis accelerations and operatively joined to said first part, a second member displaceable in accordance with a secant function of craft bank angle and operatively joined to said second part, and means operated by said signal producing means for maintaining the craft altitude constant during the banked turn.

8. In a control system for a dirigible craft having a control surface for controlling the altitude of the craft while in a banked turn, first positioning means responsive to vertical craft axis accelerations, second positioning means responsive to bank angle, signal means including a first and second member operatively connected to be positioned by said first and second positioning means respectively and having an output in accordance with relative positions of said first and second members.

9. An automatic pilot for aircraft comprising, banking and turning means for the craft, a two part pick-off, an accelerometer constrained to measure accelerations in the craft vertical axis and operating a first part of said two part pick-off, a stabilized horizontal member, a second part of said two-part pick-off traveling on said horizontal member and movable in the craft vertical axis in response to relative motion of said horizontal member during a banked turn thereby producing a displacement of said second part in proportion to the secant of the bank angle, said pick-off producing a signal proportional to the difference between the displacements caused by said vertical craft axis accelerations and said craft bank angle, and means responsive to said signal for maintaining the craft at constant altitude during a banked turn.

10. In a control system for an aircraft, means including two relatively movable parts for producing a signal proportional to relative movement of said parts, an accelerometer having a displaceable member responsive to accelerations of vertical craft axis and operatively connected to one of said parts, a stabilized horizontal track, and element operatively connected to the other of said parts and displaceable in the vertical craft axis in accordance with the secant of the bank angle by traveling along said track as the craft banks in a turn.

11. In a flight control system for dirigible craft, a movable element constrained to motion along a vertical craft axis, means for displacing said element in accordance with a bank angle function including a vertical gyro, a substantially horizontal track-like member stabilized by said gyro and supporting said movable element.

12. In a flight control for dirigible craft, a movable element constrained in motion to a vertical craft axis, means for displacing said element as a function of bank angle including, a flat surface on which said element is supported, a device for maintaining said flat surface substantially horizontal to effectively move said constrained element along said vertical craft axis in response to relative motion between said flat surface and said movable element during a banked turn.

13. In a turn control for an aircraft, means for comparing actual aircraft vertical axis accelerations with ideal vertical axis accelerations during a banked turn including, an accelerometer having a member constrained in motion to the vertical craft axis, and a positionable element constrained in motion to said vertical craft axis and having means laterally positioning same on a stabilized horizontal plane in response to relative motion between said element and said horizontal plane during a banked turn.

14. In a turn control for an aircraft, a two-part pick-off having an output, a stabilized datum supporting one part of said pick-off to be movable laterally on said datum and movable in the vertical craft plane as the craft banks in a turn, and a vertical craft axis accelerometer supporting the other part of said pick-off.

15. In a turn control for an aircraft, a pick-off including two relatively positionable parts, an element constrained to motion paralleling the aircraft vertical axis and operatively connected to one of said parts, a stabilized horizontal member supporting said element to produce motion thereof in said aircraft vertical axis whenever said aircraft banks during a turn, an accelerometer constrained to measure accelerations in said aircraft vertical axis and operatively connected to the other of said pick-off parts, said pick-off producing a signal in response to relative positions of said parts.

16. In a turn control for an aircraft, an auto transformer having an open coil and an input voltage said coil having its axis parallel to a vertical craft axis, a horizontally stabilized wiper movable across said open coil in response to craft bank angle thereby producing a secondary transformer voltage proportional to the secant of the bank angle.

17. In a turn control for an aircraft having a turn control selector dial and means responsive thereto for entering the craft into a banked turn, signal means including two movable parts and having an output responsive to relative motion between said parts, an accelerometer having an element constrained to motion in the craft vertical axis operatively connected to one part of said signal means, a movable member constrained to motion in a plane paralleling said accelerometer element motion and operatively connected to the other part of said signal means, a supporting track for said movable member, and means for maintaining said track substantially horizontal for all angles of bank, thereby producing motion of said supported movable member in the vertical craft axis whenever the craft banks.

18. In a turn control for an aircraft, an accelerometer device responsive to vertical craft-axis accelerations and having an output in accordance therewith, a pick-off device having an output in accordance with craft pitch axis variations and operatively connected to modify the output from said accelerometer device in accordance with craft pitch angle changes, a computing device responsive to craft bank angle and having an output in accordance with a secant function thereof, and signal output means responsive to the difference in the modified accelerometer output and the computing device output.

19. In a turn control for an aircraft, an accelerometer responsive to vertical craft axis accelerations, a pick-off operatively connected to said accelerometer and having an output, a vertical gyro, a pick-off for the pitch axis of said vertical gyro having an output, and means for modifying the output from said accelerometer pick-off in accordance with the output from said gyro pitch axis pick-off.

20. In a turn control for an aircraft, an accelerometer device for producing a displacement responsive to accelerations of the craft along the normally vertical craft axis, a resolving device for producing a displacement responsive to a secant function of craft bank angle, and a signal producing means differentially responsive to said displacements.

21. In a turn control system for dirigible craft, signal means for controlling the elevation of the craft having two relatively displaceable parts, a vertical craft axis accelerometer operatively connected to one of said parts, and a device computing the banking angle of the craft operatively connected to the other of said parts.

ORLAND E. ESVAL.

REFERENCES CITED

The following references are of record in the file of this patent:

UNITED STATES PATENTS

| Number | Name | Date |
| --- | --- | --- |
| 1,154,396 | Hayot | Sept. 21, 1915 |
| 1,801,948 | Boykow | Apr. 21, 1931 |
| 1,992,970 | Sperry et al. | Mar. 5, 1935 |
| 2,125,361 | Schwarzler | Aug. 2, 1938 |
| 2,386,777 | Bentley | Oct. 16, 1945 |